United States Patent
Eppler et al.

(10) Patent No.: US 6,519,372 B1
(45) Date of Patent: Feb. 11, 2003

(54) NORMALIZED CROSSCORRELATION OF COMPLEX GRADIENTS FOR IMAGE AUTOREGISTRATION

(75) Inventors: Walter G. Eppler, Saratoga, CA (US); David W. Paglieroni, Pleasanton, CA (US); Sidney M. Petersen, Tracy, CA (US); Marcus J. Louie, Sunnyvale, CA (US)

(73) Assignee: Lockheed Martin Corporation, Bethesda, MD (US)

( * ) Notice: Subject to any disclaimer, the term of this patent is extended or adjusted under 35 U.S.C. 154(b) by 0 days.

(21) Appl. No.: 09/386,246

(22) Filed: Aug. 31, 1999

(51) Int. Cl.[7] .................................................. G06K 9/32
(52) U.S. Cl. ........................ 382/294; 382/278; 382/280
(58) Field of Search ................................. 382/294, 280, 382/278, 293, 295, 296, 266, 107, 113, 154, 191, 276; 250/334

(56) References Cited

U.S. PATENT DOCUMENTS 3,748,644 A * 7/1973 Tisdale .................... 340/149 A
5,274,236 A * 12/1993 Pascale et al. .............. 250/334
5,550,937 A * 8/1996 Bell et al. .................... 382/293

* cited by examiner

Primary Examiner—Jose L. Couso
Assistant Examiner—Kanji Patel
(74) Attorney, Agent, or Firm—Kenneth W. Float

(57) ABSTRACT

A system and method that computes the degree of translational offset between corresponding blocks extracted from images acquired by two sensors, such as electro-optic, infrared sensors, and radar for example, so that the images can be spatially registered. The present invention uses fast Fourier transform (FFT) correlation to provide for speed, and also uses gradient magnitude and phase (direction) information to provide for reliability and robustness.

17 Claims, 3 Drawing Sheets

Fig. 1a

SAR RESPONSE TABLE

| REGION NUMBER | MATERIAL | BRIGHTNESS |
|---|---|---|
| 1 | BARE EARTH | 100 |
| 2 | WATER | 50 |
| 3 | CONCRETE | 150 |
| 4 | TREE CANOPY | 250 |
| 5 | ASPHALT | 200 |

GROUND SCENE COMPOSITION

1. BARE EARTH
2. WATER
3. CONCRETE
4. TREE CANOPY
5. ASPHALT

EO SENSOR RESPONSE TABLE

| REGION NUMBER | MATERIAL | BRIGHTNESS |
|---|---|---|
| 1 | BARE EARTH | 200 |
| 2 | WATER | 150 |
| 3 | CONCRETE | 250 |
| 4 | TREE CANOPY | 100 |
| 5 | ASPHALT | 50 |

Fig. 1b

GROUND SCENE SENSED BY SAR

BARE EARTH 100
WATER 50
CONCRETE 150
TREE CANOPY 250
ASPHALT 200

Fig. 1c

GROUND SCENE SENSED BY EO SENSOR

BARE EARTH 200
WATER 150
CONCRETE 250
TREE CANOPY 100
ASPHALT 50

NORMALIZED CROSSCORRELATION OF COMPLEX GRADIENTS FOR IMAGE AUTOREGISTRATION

BACKGROUND

The present invention relates generally to aircraft-based and satellite-based imaging systems, and more particularly, to a system and method for computing the degree of translational offset between corresponding blocks extracted from images acquired by different sensors so that the images can be spatially registered.

The assignee of the present invention has developed and deployed a digital image processing system that registers images acquired under different conditions and using different types of sensors (e.g., electro-optical camera and synthetic aperture radar). This accurate pixel-to-pixel registration improves the exploitation of such imagery in three ways:

It makes it possible to detect changes in reconnaissance imagery acquired at two different times. It improves the Image Analyst's ability to interpret the imagery by viewing the ground scene in two different spectral bands (e.g., visible and microwave).

It makes it possible to determine the exact location of objects detected in reconnaissance imagery by transferring them to reference imagery that has been very accurately referenced to the earth.

In order to properly exploit images acquired by different sensors, the two images must be registered to each other. One prior art technique to perform this image registration is disclosed in U.S. Pat. No. 5,550,937 entitled "Mechanism for Registering Digital Images Obtained from Multiple Sensors Having Diverse Image Collection Geometries", issued Aug. 27, 1996.

In the known prior art disclosed in U.S. Pat. No. 5,550,937, methods for matching image blocks using image gradient magnitude information have been developed that work well with two images acquired with the same type of sensor (e.g., radar for both or electro-optical for both). However, heretofore, no method has been developed that uses a fast Fourier transform (for speed) and also makes use of both gradient magnitude and phase (direction) information to reliably and robustly spatially register the images from two different types of sensors.

Accordingly, it is an objective of the present invention to provide for a system and method for computing the degree of translational offset between corresponding blocks extracted from images acquired by different sensors so that the images can be spatially registered.

SUMMARY OF THE INVENTION

To accomplish the above and other objectives, the present invention provides for a system and method that computes the degree of translational offset between corresponding blocks extracted from images acquired by two sensors, such as electro-optic, infrared sensors, and radar for example, so that the images can be spatially registered. The present invention uses fast Fourier transform (FFT) correlation to provide for speed, and also uses gradient magnitude and phase (direction) information to provide for reliability and robustness.

In the present invention, two potentially dissimilar images acquired by two potentially different sensors, such as a synthetic aperature radar (SAR) and a visible band camera, for example, are resampled to a common resolution and orientation using image acquisition parameters provided with the imagery. The present invention provides an efficient robust mechanism for computing the degree of translational offset between corresponding blocks extracted from the two resampled images so that they can be spatially registered.

The present system and method matches image blocks extracted from the two resampled images and makes use of the intensity gradient of both images that are matched. The two points of novelty implemented in the present invention are that both gradient magnitude and phase (direction) information are used by the matching mechanism to improve the robustness and reliability of the matching results, and the matching mechanism uses a fast Fourier transform (FFF) so it can quickly match large image blocks even on a small personal computer.

The matching mechanism has several advantages over the prior art disclosed in U.S. Pat. No. 5,550,937. The present invention combines both gradient magnitude and phase information so that image structure is automatically and implicitly taken into account by the matcher. The present invention performs magnitude normalization so that the relative differences in intensity bias and gain between image blocks are ignored by the matcher. This normalization also makes the algorithm insensitive to spatial nonstationarity of edges (i.e., varying number of detailed features within each subarea) within the scene. The present invention makes use of the fast Fourier transform (FFT) so that matching results can be computed very rapidly even on a small personal computer.

BRIEF DESCRIPTION OF THE DRAWINGS

The various features and advantages of the present invention may be more readily understood with reference to the following detailed description taken in conjunction with the accompanying drawing, wherein like reference numerals designate like structural elements, and in which:

FIGS. 1a–1c illustrate the nature of multisensor and multitemporal image matching in which the present invention is employed;

DETAILED DESCRIPTION

Figure 2:
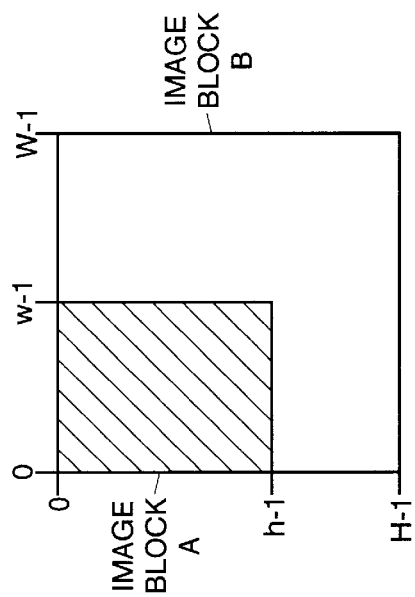
FIG. 2 illustrates an exemplary image misregistration that is corrected by the present invention.

Referring to the drawing figures, FIGS. 1a–1c illustrate the nature of multisensor and multitemporal image matching in which the present invention is employed. The present invention addresses the problem of automatically registering images acquired by potentially very different sensors, such as a synthetic aperture radar (SAR) and a visible band camera. Such images may be derived from sensors disposed on reconnaissance aircraft or an orbiting satellite, for example. The originally acquired images are resampled (using image acquisition parameters supplied with the imagery) to a common scale and orientation. However, corresponding blocks within the images may have residual offsets relative to one another due to errors in the image acquisition parameters. The present invention provides for a system and method for correcting the relative offset between a small image block (site) extracted from a first image and a corresponding image block (site) extracted from a second, potentially very dissimilar image.

FIG. 1a shows representative response tables for a synthetic aperature radar (SAR) and an electro-optical (EO) camera along with composition of the ground scene imaged by both sensors. The image acquired by a synthetic aperature radar (SAR) shown in FIG. 1b b differs from the image acquired by the electro-optical camera shown in FIG. 1c even though the ground scene shown in FIG. 1a, is the same for both. This is due to the fact that a given material on the ground (bare earth, region 1) such as water (region 2), concrete (region 3), trees (region 4), and asphalt (region 5), for example) produces different brightness values when viewed by the two sensors. As is shown in FIG. 1b, the ground scene sensed by the synthetic aperture radar has brightness levels of 100 for bare earth, 50 for water, 150 for concrete, 250 for trees, and 200 for asphalt. In contrast, as is shown in FIG. 1c, the ground scene sensed by the electro-optic sensor has brightness levels of 200 for bare earth, 150 for water, 250 for concrete, 100 for trees, and 50 for asphalt. These contrast reversals make conventional intensity-based crosscorrelation methods, such as disclosed in U.S. Pat. No. 5,550,937, unreliable and inaccurate. The property that is consistent in the two images is the location and direction of edges separating different materials in the ground scene. These edges are detected as gradients in the respective gray-scale images.

Gradients (e.g., derived using a Sobel operator) have, at every pixel, both magnitude and direction (phase). This suggests that the similarity between two images (i.e., SAR and translated electro-optical) can be measured in terms of the amount of correlation between the respective directions of the gradients for all pixels within a prescribed region (i.e., a site). This is accomplished in accordance with the principles of the present invention by crosscorrelating the complex (i.e., magnitude and phase) gradients over the site. In particular, the gradient magnitudes are weighted by a multiplicative function that decreases with increasing difference in the directions of the gradients in the two images.

Three additional factors are taken into account. A weighting function $W(\delta+180)$ must be equal to $W(\delta)$, where $\delta$ is the difference (in degrees) between the respective gradient angles. This is due to the fact that the phase of the complex gradient can differ by $\pm 180$ degrees at a given edge depending on the polarity of the brightness difference across that boundary. A preferred weighting function that is used is $W(\delta)=\cos^{2n}(\delta)$ where n is a positive integer. In the explanation that follows, n is taken to be unity. The cross correlation function is normalized to reduce the dependence on the magnitudes of the complex gradients. This is because the magnitude of the gradient across a given boundary varies depending on the brightness difference across that boundary. The crosscorrelation function is normalized to reduce the dependence on the number of edges within the site. Without this normalization, the crosscorrelation function would be highest for sites containing the most edges (i.e., clutter).

FIG. 2 illustrates exemplary image misregistration that is corrected by the present invention. In FIG. 2, image block A is offset horizontally and vertically within image block B to determine the match point. By way of example, suppose image block A has w columns and h rows while image block B has W>w columns and H>h rows.

Suppose that a w by h chip is extracted from block B with the upper left corner at $B(\Delta_c,\Delta_r)$ and that this chip is matched with block A. In this case, the range of permissible column and row offsets of image block A relative to image block B is $\Delta_c=0, \ldots,$ W-w and $\Delta_r=0, \ldots,$ H-h.

Figure 3:
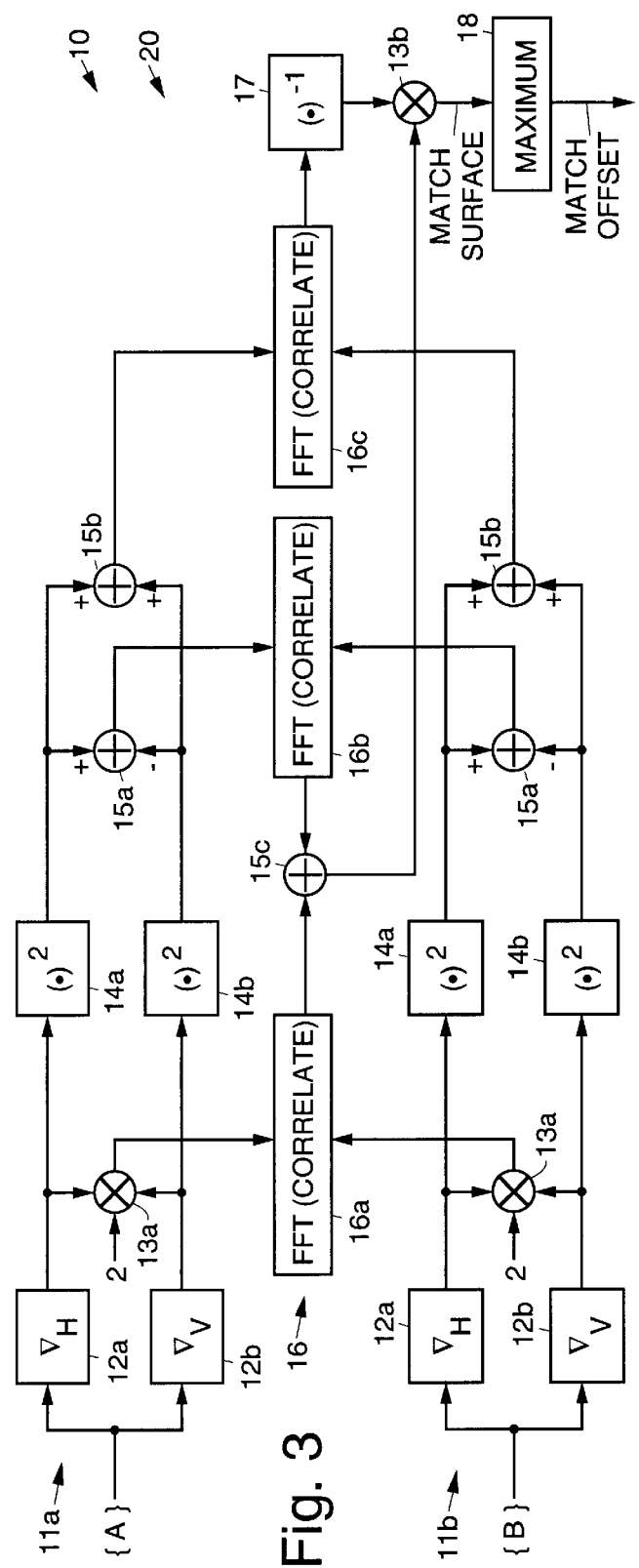
FIG. 3 illustrates an exemplary system and method in accordance with the principles of the present invention.

The present invention provides a near real-time FFT-based realization of a novel match measure:

$$\phi_{BA}(\Delta_c,\Delta_r) = \frac{\sum_{c=0}^{w-1}\sum_{r=0}^{h-1}\{\cos^2[\theta_A(c,r)-\theta_B(c+\Delta_c,r+\Delta_r)]|\nabla_A(c,r)|^2|\nabla_B(c+\Delta_c,r+\Delta_r)|^2\}}{\sum_{c=0}^{w-1}\sum_{r=0}^{h-1}\{|\nabla_A(c,r)|^2|\nabla_B(c+\Delta_c,r+\Delta_r)|^2\}}$$

between image blocks A and B extracted from different images (which have been resampled, using the image acquisition parameters, so as to have the same scale and orientation), as shown in FIG. 3.

More particularly, FIG. 3 illustrates an exemplary system 10 and method 20 for providing a normalized crosscorrelation of complex gradients using fast Fourier transforms (FFTs) 16.

The following symbols are used with reference to the above equation and FIG. 3:

c: pixel column index r: pixel row index

{A}: a set of pixels in an image block A to which an offset is applied, w: the width of (or number of columns in) image block A, h: the height of (or number of rows in) image block A, {B}: a set of pixels in image block B that image block A is offset relative to, $\Delta_c$: the column offset of image block A relative to image block B, and $\Delta_r$: the row offset of image block A relative to image block B, and $\nabla_A(c,r)=|\nabla_A(c,r)|e^{j\theta_A(c,r)}=(\nabla_A)_H(c,r)+j(\nabla_A)_V(c,r)$, and $\nabla_B(c,r)=|\nabla_B(c,r)|e^{j\theta_B(c,r)}=(\nabla_B)_H(c,r)+j(\nabla_B)_V(c,r)$ are intensity gradients at a pixel with (column, row) coordinates (c, r) in images A and B expressed in magnitude-phase form and horizontal-vertical gradient form.

Referring to FIG. 3, the system 10 comprises an algorithm that implements the above match measure equation. In FIG. 3, the above equation has been implemented such that the term $\cos^2(a)=\frac{1}{2}(1+\cos 2a)$.

The system 10 processes blocks of images acquired by first and second sensors. The images are resampled to a common scale and orientation, and a relative offset exists between a set of pixels {A} extracted from the first image and a corresponding set of pixels {B} extracted from the second image.

The system 10 has first and second processing paths 11a, 11b that respectively process a set of pixels {A} in an image block A to which an offset is applied, and a set of pixels {B} in an image block B relative to which image block A is offset. In each processing path 11a, 11b, the respective sets of pixels {A}, {B} are processed using intensity gradient circuits 12a, 12b to generate intensity gradients at each pixel with (column, row) coordinates (c, r) in images A and B expressed in magnitude-phase form and horizontal-vertical gradient form. The intensity gradient circuits 12a, 12b may comprise Sobel operators, for example.

Outputs of the intensity gradient circuits 12a, 12b in each processing path 11a, 11b are multiplied together and by a factor of two in a first multiplier 13a to produce complex gradients. Outputs of the first multipliers 13a are input to a first fast Fourier transform 16a that crosscorrelates the respective inputs.

The outputs of the intensity gradient circuits 12a, 12b in each processing path 11a, 11b are respectively input to squaring circuits 14a, 14b. Outputs of the squaring circuits 14a, 14b in each processing path 11a, 11b are input to a first adder 15a where they are subtracted. Outputs of the first adders 15a in each processing path 11a, 11b are input to a second fast Fourier transform 16b that crosscorrelates the respective inputs. The outputs of the first and second fast Fourier transforms 16a, 16b are summed in a third adder 15c.

Outputs of the squaring circuits 14a, 14b in each processing path 11a, 11b are input to a second adder 15b where they are added. Outputs of the second adders 15b in each processing path 11a, 11b are input to a third fast Fourier transform 16c that crosscorrelates the respective inputs. The output of the third fast Fourier transform 16c is inverted in an inverter circuit 17.

The output of the third adder 15c and the output of the inverter circuit 17 are multiplied together, and thus normalized, in a second multiplier 13b, which produces a match surface. A maximum value in the match surface is determined in a maximum value circuit 18 to produce a match offset, which is the output of the system 10.

Figure 4:
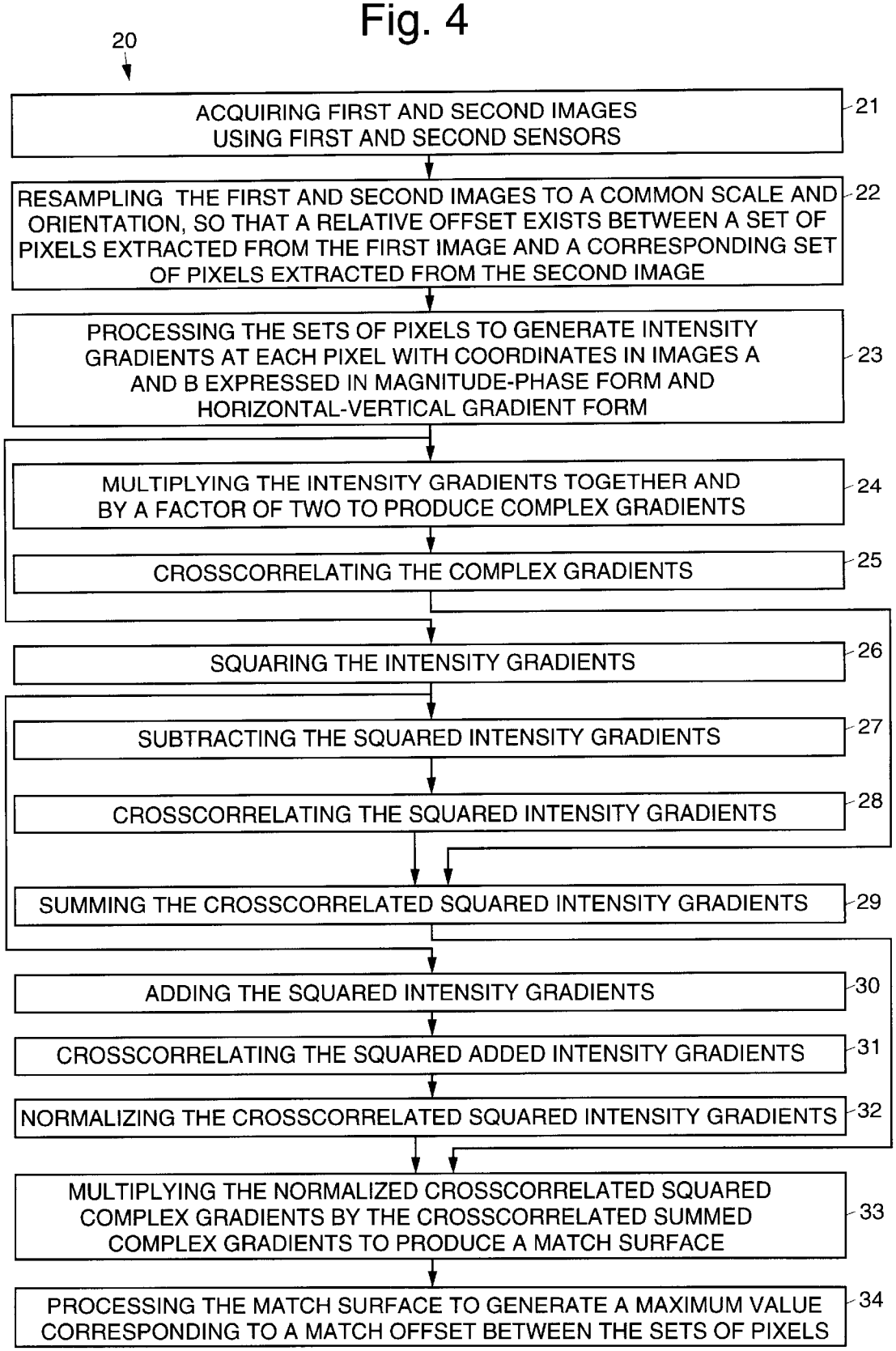
FIG. 4 is a flow diagram illustrating an exemplary method in accordance with the principles of the present invention.

For the purposes of completeness, FIG. 4 is a flow diagram illustrating an exemplary method 20 in accordance with the principles of the present invention. The exemplary method 20 comprises the following steps.

First and second images are acquired 21 using first and second sensors. The first and second images are resampled 22 to a common scale and orientation, such that a relative offset exists between a set of pixels {A} extracted from the first image and a corresponding set of pixels {B} extracted from the second image.

The respective sets of pixels {A}, {B} are processed to generate 23 intensity gradients at each pixel with (column, row) coordinates (c, r) in the images expressed in magnitude-phase form and horizontal-vertical gradient form. The intensity gradients are multiplied together and by a factor of two 24 to produce complex gradients. The complex gradients are crosscorrelated 25 by a first fast Fourier transform 16a.

The intensity gradients are squared 26, are subtracted 27 from each other, and are crosscorrelated 28 in a second fast Fourier transform 16b. The crosscorrelated intensity gradients produced by the first and second fast Fourier transforms 16a, 16b are summed together 29.

The squared intensity gradients are added 30 and crosscorrelated 31 in a third fast Fourier transform 16c. The crosscorrelated squared intensity gradients are normalized 32 and are multiplied 33 by the crosscorrelated summed intensity gradients to produce a match surface. The match surface is then processed 34 to generate a maximum value that corresponds to a match offset between the sets of pixels {A} {B}.

Thus, a system and method for computing the degree of translational offset between corresponding blocks extracted from images acquired by different sensors so that the images can be spatially registered have been disclosed. It is to be understood that the above-described embodiments are merely illustrative of some of the many specific embodiments that represent applications of the principles of the present invention. Clearly, numerous and other arrangements can be readily devised by those skilled in the art without departing from the scope of the invention.

What is claimed is:

1. A system for computing a degree of translational offset between corresponding sets of pixels {A}, {B} extracted from images acquired by first and second sensors so that the images can be spatially registered, which images are resampled to a common scale and orientation, and wherein a relative offset exists between a set of pixels {A} extracted from the first image and a corresponding set of pixels {B} extracted from the second image, comprising:

intensity gradient circuitry for generating intensity gradient magnitude and phase information regarding the sets of pixels;

multiplication circuitry, for multiplying the gradients;

squaring circuitry for generating the square of gradient information regarding the sets of pixels;

addition circuitry for subtracting and adding, respectively, the squares of gradients and for adding the outputs of FFT correlators;

matching circuitry for crosscorrelating the magnitude and phase gradients over the sets of pixels; and normalizing circuitry for normalizing the crosscorrelated magnitude and phase gradients.

2. The system recited in claim 1 wherein the matching circuitry comprises fast Fourier transforms.

3. The system recited in claim 1 wherein the matching circuitry implements a predetermined weighting function that comprises a multiplicative function that decreases with increasing difference in directions of the gradients in the set of pixels.

4. The system recited in claim 1 wherein matching circuitry implements a predetermined weighting function that comprises a weighting function $W(\delta+180)$ that equal to $W(\delta)$, where $\delta$ is the difference in degrees between respective gradient angles.

5. The system recited in claim 4 wherein the predetermined weighting function is $W(\delta)=\cos^{2n}(\delta)$.

6. A system for computing a degree of translational offset between corresponding sets of pixels {A}, {B} extracted from first and second images acquired by first and second sensors so that the images can be spatially registered, which images are resampled to a common scale and orientation, and wherein a relative offset exists between a set of pixels {A} extracted from the first image and a corresponding set of pixels {B} extracted from the second image, comprising:

first and second processing paths that respectively process the set of pixels {A} in the first image to which an offset is applied, and a set of pixels {B} in the second image relative to which the first image is offset, which processing pairs comprise:

intensity gradient circuits for processing the respective sets of pixels {A}, {B} to generate intensity gradients at each pixel with coordinates in the first and second images expressed in magnitude-phase form and horizontal-vertical gradient form;

a first multiplier for multiplying outputs of the intensity gradient circuitry together and by a factor of two to produce complex gradients;

squaring circuits for squaring the complex gradients output by the intensity gradient circuitry;

a first adder for subtracting outputs of the squaring circuits; and a second adder for adding outputs of the squaring circuits;

a first crosscorrelating circuit for crosscorrelating outputs of the first multipliers;

a second crosscorrelating circuit for crosscorrelating outputs of the first adders;

a third adder for adding outputs of the first and second crosscorrelating circuits;

a third crosscorrelating circuit for crosscorrelating outputs of the second adders;

an inverter circuit for inverting the crosscorrelated output of the third crosscorrelating circuit;

a third multiplier for multiplying outputs of the third adder and the inverter circuit to produce a match surface; and in a maximum value circuit for processing the match surface to produce a match offset.

7. The system recited in claim 6 wherein respective crosscorrelating circuits each comprise a fast Fourier transform.

8. A method for computing a degree of translational offset between corresponding sets of pixels {A}, {B} extracted from images acquired by first and second sensors so that the images can be spatially registered, comprising the steps of:

resampling the first and second images to a common scale and orientation, and wherein a relative offset exists between a set of pixels {A} extracted from the first image and a corresponding set of pixels {B} extracted from the second image;

generating intensity gradient magnitude and phase information regarding the sets of pixels to detect edges in the images;

multiplying phase gradient information regarding the sets of pixels;

squaring the intensity gradient information regarding the sets of pixels;

crosscorrelating the magnitude and phase gradients over the sets of pixels; and normalizing the crosscorrelated magnitude and phase gradients.

9. The method recited in claim 8 wherein the crosscorrelating step comprises fast Fourier transforming the magnitude and phase gradients over the sets of pixels.

10. The method recited in claim 8 wherein the matching circuitry implements a predetermined weighting function that comprises a multiplicative function that decreases with increasing difference in directions of the gradients in the sets of pixels.

11. The method recited in claim 8 wherein the matching circuitry implements a predetermined weighting function that comprises a weighting function $W(\delta+180)$ that is equal to $W(\delta)$, where $\delta$ is the difference in degrees between respective gradient angles.

12. The method recited in claim 11 wherein the predetermined weighting function is $W(\delta)=\cos^{2n}(\delta)$.

13. A method for computing a degree of translational offset between corresponding sets of pixels {A}, {B} extracted from images acquired by first and second sensors so that the images can be spatially registered, comprising the steps of:

resampling the first and second images to a common scale and orientation, and wherein a relative offset exists between a set of pixels {A} extracted from the first image and a corresponding set of pixels {B} extracted from the second image;

processing the respective sets of pixels {A}, {B} to generate intensity gradients at each pixel with coordinates in images A and B expressed in magnitude-phase form and horizontal-vertical gradient form;

multiplying the intensity gradients together and by a factor of two to produce complex gradients;

crosscorrelating the complex gradients;

squaring the intensity gradients;

subtracting the squared intensity gradients from each other;

crosscorrelating the subtracted squared intensity gradients;

summing the crosscorrelated intensity gradients produced by the first and second fast Fourier transforms;

adding the squared intensity gradients;

crosscorrelating the added squared intensity gradients;

normalizing the crosscorrelated squared intensity gradients;

multiplying the normalized crosscorrelated squared intensity gradients by the crosscorrelated summed intensity gradients to produce a match surface; and processing the match surface to generate a maximum value that corresponds to a match offset between the sets of pixels {A} {B}.

14. The method recited in claim 13 wherein the crosscorrelating steps each comprise fast Fourier transforming the magnitude and phase gradients over the sets of pixels.

15. The method recited in claim 13 wherein the matching circuitry implements a predetermined weighting function that comprises a multiplicative function that decreases with increasing difference in directions of the gradients in the sets of pixels.

16. The method recited in claim 13 wherein the matching circuitry implements a predetermined weighting function that comprises a weighting function $W(\delta+180)$ that is equal to $W(\delta)$, where $\delta$ is the difference in degrees between respective gradient angles.

17. The method recited in claim 16 wherein the predetermined weighting function is $W(\delta)=\cos^{2n}(\delta)$.

* * * * *